United States Patent

[11] 3,621,935

| [72] | Inventor | John J. Bode |
| | | 1923 West 9th St., Hastings, Nebr. 68901 |
| [21] | Appl. No. | 854,649 |
| [22] | Filed | Sept. 2, 1969 |
| [45] | Patented | Nov. 23, 1971 |

[54] VEHICLE MOUNTED LADDERLIKE TOWER
7 Claims, 14 Drawing Figs.

[52] U.S. Cl. .................................................. 182/68,
182/127
[51] Int. Cl. ...................................................... E06c 5/04
[50] Field of Search ............................................ 182/68,
127, 201; 52/118, 117, 116

[56] References Cited
UNITED STATES PATENTS
1,899,742  2/1933  Bay .............................. 182/210
2,300,763  11/1942  Athy ............................. 52/118
2,586,531  2/1952  Gordon ......................... 182/68
3,021,921  2/1962  Poelvoorde .................... 182/201
3,043,398  7/1962  Bakula .......................... 182/68

Primary Examiner—Reinaldo P. Machado
Attorney—Scofield, Kokjer, Scofield & Lowe

ABSTRACT: A mobile ladderlike tower on which workmen can ascend to and work at substantial heights above the ground in safety. It has an electrically insulated, partially caged work platform. The tower is for mounting on a pickup truck or other vehicle, and is capable of swinging movement between a horizontal stored carrying position overlying the vehicle and a stabilized upright working position. The tower if made up of telescopic sections for selective extension and retraction and includes appropriate elevating and latching devices for the various conditions of storage and use.

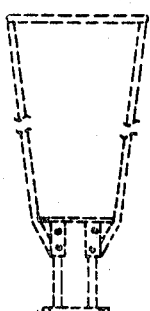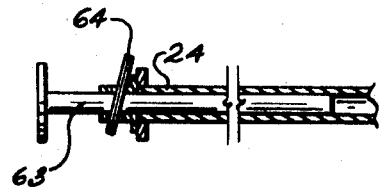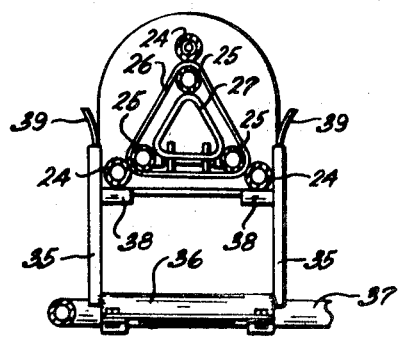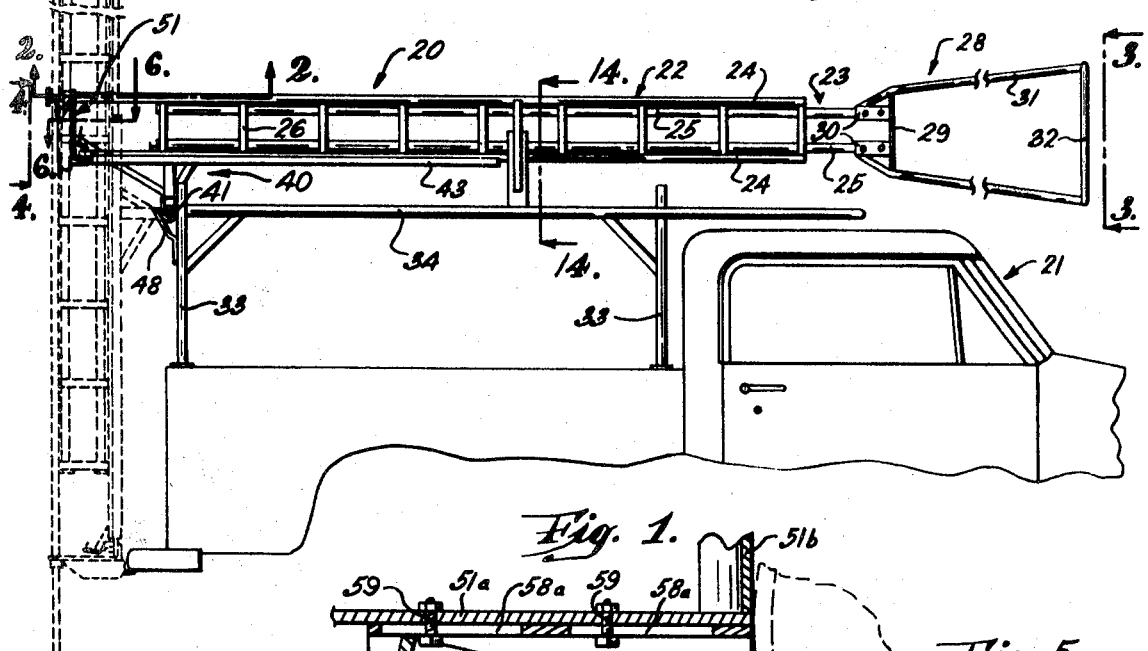
Fig. 1.
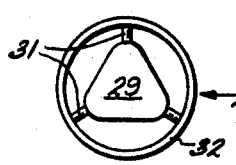
Fig. 3.
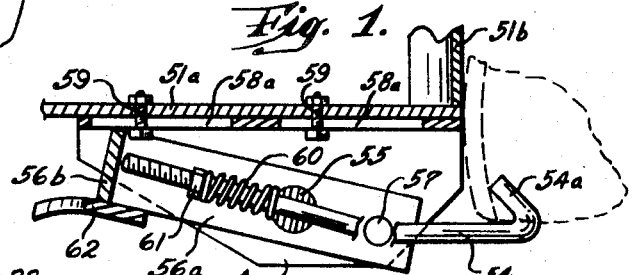
Fig. 5.
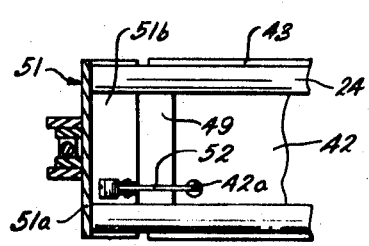
Fig. 6.
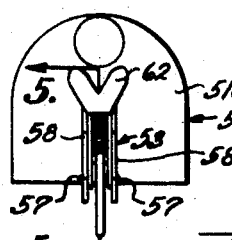
Fig. 4.
INVENTOR.
John J. Bode
BY
ATTORNEYS

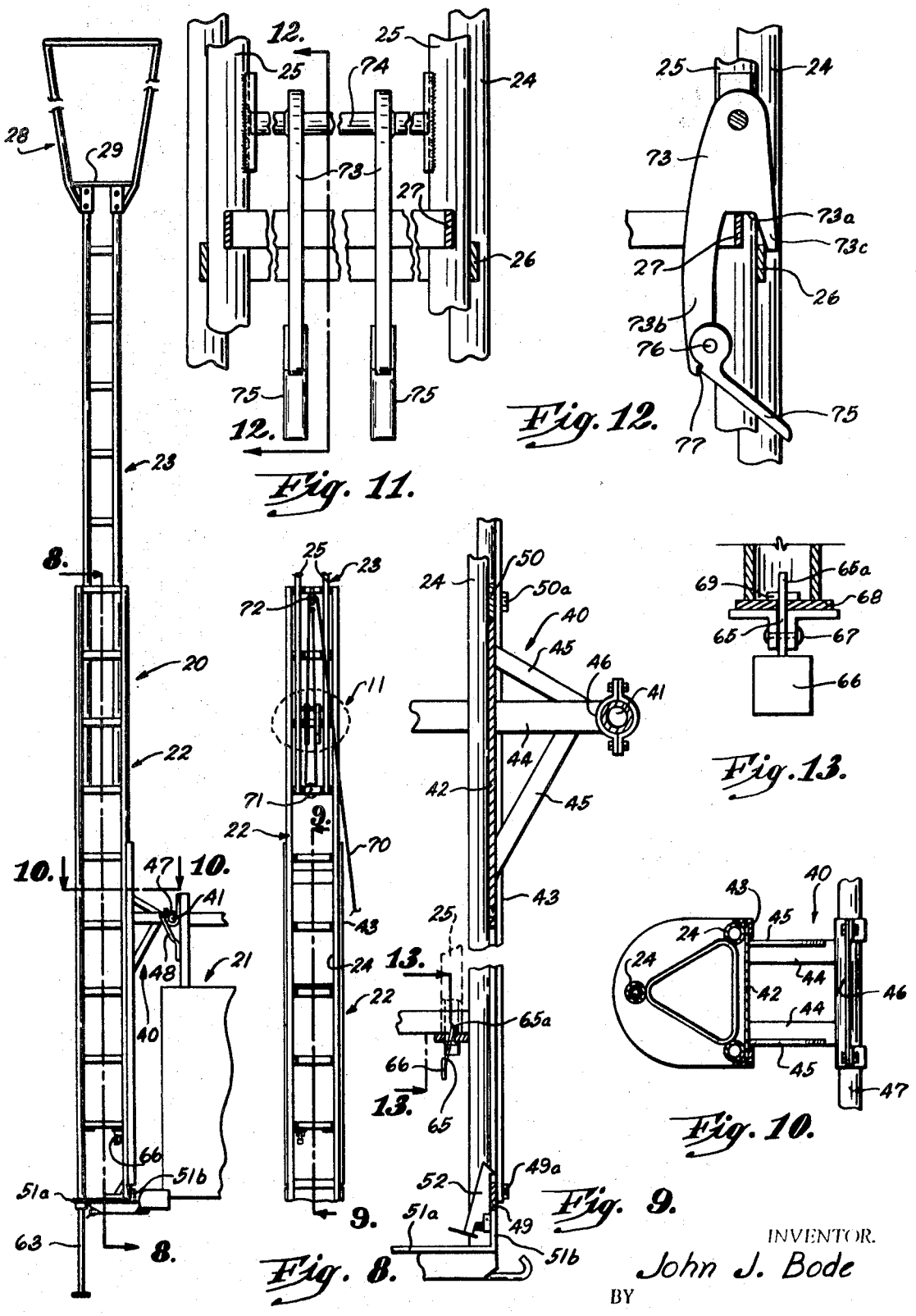

VEHICLE MOUNTED LADDERLIKE TOWER

SUMMARY OF THE INVENTION

One of the principal objects served by the invention is the provision of a relatively simple low-cost and safe ladder-type tower which can be carried around by a pickup truck or similar vehicle and quickly erected from its stored carry position to an upright working position. My invention finds particular utility in connection with tasks involving climbing up to and working around power, cable television and telephone lines.

Included among the many aspects of construction and operation of my tower are a number of special features which effect its ready erection and return to the carry position, its stability when erected and its versatility in use. It has the capability of being operable by a single workman who, with a minimum of effort, can raise and lower it at will, can return it to the stored carry position and, once again, put it back in the upright position. All manipulative steps involved can be performed while standing on the ground. The construction is such that, when standing and working at the top of the tower, the workman is insulated electrically from ground and is thus protected from shock hazards.

Other and further features and objects of the invention will become apparent during the course of the following description.

DETAILED DESCRIPTION

In the accompanying drawings, which form a part of the specification and are to be read in conjunction therewith and in which like reference numerals indicate like parts in the various views:

FIG. 1 is a side elevational view showing a preferred form of tower embodying my invention, the tower positioned in the horizontal stored position on the carrier vehicle;

FIG. 2 is a fragmentary sectional view, on a greatly enlarged scale, taken generally along line 2—2 of FIG. 1 in the direction of the arrows;

FIG. 3 is an end view of the working basket and platform of the tower being taken generally on line 3—3 of FIG. 1 in the direction of the arrows;

FIG. 4 is an end view, on an enlarged scale, of the rearward or bottom end of the unit, being taken generally on line 4—4 of FIG. 1 in the direction of the arrows;

FIG. 5 is a fragmentary sectional view, on an enlarged scale, taken generally along line 5—5 of FIG. 4 in the direction of the arrows and showing details of the bumper-holding latch utilized for maintaining the tower upright when in use;

FIG. 6 is a fragmentary sectional view, on an enlarged scale, taken along line 6—6 of FIG. 1 in the direction of the arrows and showing the latching means normally holding the tower in the forward condition shown on solid lines in FIG. 1;

FIG. 7 is a side elevational view illustrating the tower in an upright partially extended condition of normal use;

FIG. 8 is a fragmentary sectional view taken along line 8—8 of FIG. 7 in the direction of the arrows;

FIG. 9 is a fragmentary sectional view, on an enlarged scale, taken on line 9—9 of FIG. 8 on the direction of the arrows, the breaklines indicating interrupted length;

FIG. 10 is a fragmentary sectional view, on an enlarged scale, taken along line 10—10 of FIG. 1 in the direction of the arrows;

FIG. 11 is an enlargement of the encircled area 11 of FIG. 8, the breaklines indicating interrupted length;

FIG. 12 is a sectional view taken generally along line 12—12 of FIG. 11 in the direction of the arrows;

FIG. 13 is a partly sectional view taken along line 13—13 of FIG. 8 and showing the details of the inner tower section holding latch; and FIG. 14 is a sectional view, on an enlarged scale, taken along line 14—14 of FIG. 1 in the direction of the arrows.

Referring now to the drawings and initially to FIG. 1, the preferred tower structure 20 is designed for mounting upon the bed of a typical pickup-type truck 21. In FIG. 1, the solid lines depict the tower in a stored position in which it normally rides for travel from one location to another. The broken lines illustrate a typical upright position for the tower with the tower at its minimum height but illustrating generally the position which is assumed in use.

The main portion of the tower is made up of two telescopically related sections 22 and 23, the relationship of which may best be seen in FIG. 7, which shows the tower in an extended position. The sections 22 and 23 are similar in cross-sectional construction, each comprising a triangular network of parallel longitudinal pipes or tubes 24 and 25, respectively, which are interconnected at intervals along the length of the network by triangular struts. Referring to FIGS. 10 and 14 which are cross-sectional views, the struts for the outermost, or larger cross sectional, tower section are indicated at 26 and those for the inner extendable section 23 at 27. The struts 26 are welded to the pipes 24 while struts 27 are welded to pipes 25, the pipes lying at the outer corners of the triangularly shaped ribs. Thus, the tower section 23 can slide longitudinally within tower section 22.

Located at the forward (the upper) end of the extendable inner tower section 23 is the working platform and basket 28. This includes the platform 29 which is secured to the end of the tower section by bolted brackets 30 and the struts 31 which are joined at their ends by ring 32. In dimensions, the length of the basket 28 is approximately 3 feet so that when a workman is standing with his feet on platform 29 the ring 32 will be approximately at waist height. The platform 29, struts 31 and ring 32 are all covered with a layer of dielectric material, for example, a glass-reinforced resin, or can be made of such a resin, in order to electrically insulate the working area from the tower.

In its stored position, the tower is supported on a rack mounted to the bed of the truck. In the preferred embodiment, the rack is made of tubing and includes upright posts 33 at opposite ends of the side rails of the truck bed. Extending between and secured to the posts 33 are the longitudinal pipe lengths 34. It will be understood that while only one side of the rack is shown in FIG. 1, the other side is substantially the same; i.e., that the rack is symmetrical with respect to the longitudinal centerline of the truck. Crossbraces (not shown) join the posts 33.

The midportion of the tower rests removably on a cradle which is shown best in FIG. 14. The cradle includes the parallel upright legs 35 which are connected to a clamping sleeve 36. The sleeve 36 is clamped on to a crossmember 37 which extends between the frame members 34. Each upright leg of the cradle has mounted thereto an inwardly extending, preferably rubber covered, roller 38 positioned to underlie one of the tubes 24 of the ladder section 22. Slightly flared members 39 extend above the upper ends of posts 35 to assist in guiding the ladder into the cradle as it is moved from the upright to the horizontal stored position.

The main support for the overall tower provides for swinging movement between the solid and broken line positions of FIG. 1. Thus, the rearward portion tower is carried by the horizontal portion of a pivotal frame 40 which is capable of pivoting about a pivot axis 41 which extends horizontally and transversely of the truck bed just to the rear of the rearmost frame post 33. As will subsequently be seen, the entire tower is slidably connected with frame 40.

Referring particularly to FIGS. 8, 9 and 19, which, in orientation, correspond with the broken line position of FIG. 1, the frame 40 has as its main body a flat plate 42 which is parallel with and adjacent pipes 24 of the outer ladder section 22. The width of plate 42 is slightly less than the overall distance between the outer edges of pipes 24. Each pipe 24 has welded thereto an angle member 43, the angle members extending toward the plate 42 and past with it with one flange of the angle overlapping the opposed side edges of the plate. Each such flange is spaced sufficiently far from the periphery of pipe 24 as to provide a sliding fit for the plate between the flange and the pipe. It will thus be evident that the ladder section 22 can slide along the plate.

The plate 42 has extending therefrom the arms 44. Arms 44 are rigidly connected with the plate by means of braces 45 and terminate at the clamping sleeve 46 which is clamped around a pipe 47. The ends of pipe 47 are supported in appropriate journal brackets 48 on the rearmost frame posts 33 (see FIGS. 1 and 7).

The distance that the tower ladder may slide or be displaced with respect to plate 42 is determined by a pair of crossbars 49 and 50, which are best seen in FIG. 9. Each of the crossbars 49 and 50 is a simple bar which extends between the flange of angle member 43 and adjacent pipe 24 and is bolted to the angle as at 49a and 50a. Bars 49 and 50 are thus an integral part of the lower tower section 22 and move therewith.

It will be noted that the bars 49 and 50 are spaced apart a greater distance than the overall length of plate 42. In the stored condition, i.e., with the tower horizontal as shown in FIG. 1, the stop bar 49 lies adjacent the end of plate 42. Located next to the bar 49 and secured to the ends of pipes 24 is a base or end platform 51 having the step portion 51a and a leg 51b at right angles thereto and adjacent to the pipes. Mounted on the leg 51b is a pivotal latch 52. Latch 52 has a detent portion which, as shown in FIG. 6, engages within an opening 42a in plate 42. The latch is spring loaded to maintain the detent releasably engaged so that the bar 49 is held adjacent to plate 42 and the tower as a whole is prevented from sliding to the left (as viewed in FIG. 1) until such time as the latch is operated to disengage the detent from the opening.

The step 51a carries beneath it a bumper latch assembly 53. This assembly is illustrated in FIGS. 4 and 5. The latch comprises a rod 54 which extends through a diametric opening in a shaft 55. The shaft 55 is rotatably supported between the legs 56a of a yoke has a bight portion 56b connecting the legs 56a. The latter are, in turn, pivoted on stub axles 57 which are supported by parallel plates 58 of a U-shaped bracket connected to the underside of the step 51a. The connection is by means of bolts 59 which are received through the step and through elongate slots 58a in the top of the bracket which permit adjustment of the position of the bracket (and thus the latch rod) back and forth with respect to the step.

The latch rod 54 has an upturned hook portion 54a which is adapted to engage with the conventional lower in-turned flange of the truck bumper and has associated therewith resilient means for biasing the hook portion toward engagement with the bumper. As will be observed in FIG. 5, the rod is encircled by a compression spring 60 which bears at one end against the shaft 55 and at the other end against a nut 61. The rod is threaded to receive nut 61. The latch assembly is of the over-the-center type as is shown in FIG. 5 in the upwardly biased tower-holding position, a line through the hold point of hook 54a and nut 61 lying above the axis of axles 57.

The yoke bight 56b provides support for a bifurcated operating handle or step 62 which is spaced well below the step 51a and is accessible to the foot when the ladder is in its upright or operating position.

The tower section 22 includes a stabilizing leg 63 (FIG. 2) which is telescopically received within the outermost pipe 24. This leg is normally retracted but can be extended when the tower is in the upright position. Any convenient means or locking the leg 63 in an extended position can be employed. I have illustrated a conventional wobble plate arrangement 64 which is a self-energizing wedge lock. Such locking arrangements are known to the art and the details do not play any part in the present invention so no further description is believed necessary.

When the upper tower section 23 is in the retracted position within the tower section 22, it is latched to the section 22 by a detent latch arrangement shown best in FIGS. 8 and 13. This latch includes the pivoted arm 65 having the detent head 65a which is received interiorly of the end of a pipe 25 of the inner tower section. The outer end of the arm 65 carries a flat pressure plate 66 which is engageable by the hand. The lever 65 is pinned by a pin 67 which is supported by bracket members secured to a plate 68 which serves the dual function of support for the lever and as a stop-limiting movement of the inner tower section 22 in the direction of retraction. The detent head 65a is adapted to engage a shoulder 69 within the end of the tube 25. Lever 65 is spring loaded in any convenient fashion toward the engaged position of the detent with the shoulder.

Elevation of the upper tower section relative to the lower one is accomplished in much the same fashion as in conventional extension ladders. FIG. 8 shows schematically the double-pulley cable arrangement which is employed. The cable 70 is anchored at one end to a bracket secured to the upper end of the lower tower section 22, proceeds downwardly where it is trained about a pulley 71 rotatably supported at the lower end of the upper tower section 23, proceeds back up to pass around a pulley 72 supported at the upper end section 22 and then downwardly to a point where it can be grasped by an operator. The upper section can selectively be locked to the lower tower section at a plurality of elevations with respect thereto.

The automatic extension-locking mechanism is detailed in FIGS. 11 and 12. Two parallel pivotal dog members 73 are pivotally suspended from the shaft 74 which is supported between pipes 25 of the inner tower section. The dogs are so formed as to provide a notched portion 73a which is defined by an inner and rather long leg 73b and a shorter opposite leg 73c. The width of the notch 73a is substantially equal to the spacing between the opposed surfaces of parallel struts 26, 27 so that the notch can embrace both straps. At the lower end of the long leg 73b of each dog 73 is a pivotal combined activating and guard member 75. This is pivoted about an axis 76. Cooperating shoulders are provided on leg 73b and member 75, these being located at 77, are operable to limit counterclockwise swinging of member 75 with respect to leg 73b beyond the position illustrated in FIG. 12. It will be noted that in this position the member 75 is vertically beneath strut 26 so that if it is elevated it will engage strut 26. The length of member 75 is such that if swung up clockwise its tip will overlap the end of the short leg 73c.

As the tower is elevated by means of a cable 70, it will be evident that members 73 ride upwardly therewith. As each strut 26 on the outer tower section is passed by the dogs, each dog is pushed inwardly (due to contact of the outer surface of leg 73c with the strap) until the lower end of leg 73c passes the strut whereupon gravity returns the dog to the position illustrated in FIG. 12. If it is desired to stop elevation at this point and lock the extension in this position, tension on the rope is relieved and the inner tower section permitted to drop slightly. The tower will drop until notches 73a ride on top of both struts 27 and 26.

If it is desired to elevate the tower higher, one need only resume pulling on cable 70. The tower can be pulled up to whatever elevation is desired and locked at that elevation by procedure described.

To lower the tower, it is necessary only to pull the upper tower section up far enough that member 75 clears the top of the strut 26 and then commence lowering. As it moves upwardly toward and past strut 26, the member 75 will be engaged by the pivotal capabilities of dog 73 permits the members 75 to cam the dogs inwardly to clear the strut. Once the strut is cleared, the dogs return by gravity to the position illustrated in FIG. 12. At this point, members 75 are above the strut 26. As the upper section is lowered, the members 75 will swing upwardly clockwise, due to their contact with the upper edge of strut 26, and eventually will act as a cam surface to swing the dog inwardly. In other words, members 75 close the notches 73a on the down run of the upper section. Obviously, the tower can be relatched at any position simply by raising the tower slightly until the dogs 73 are in a position of FIG. 12 relative to a given strut 26 and then lowering it into the locked position as earlier described.

Taking up now the operation of the towers as a whole and starting from the stored condition of FIG. 1, to ready the tower for displacement to the upright position, the operator depresses the latch member 52 thus to clear the detent of that latch from the opening 42a in the plate 42. He then pulls outwardly (away from the truck) thus to slide the ladder as a whole with respect to plate 42. Outward movement is continued until it becomes convenient to swing the tower toward the upright position about its pivot axis 41. The tower can now be easily dropped to its full down position which corresponds to the position in which plate 50 (see FIG. 9) engages the end of plate 42. Incidentally, in order to provide adjustability of the position of bar 50, a plurality of boltholes can be provided along angle members 43 so that bolts 50a and bar 50 can be moved back and forth as desired.

As the tower is moved into its upright position, the hook portion 54a can be engaged beneath the bumper by swinging yoke handle 62 and the attached yoke downwardly. Once the hook is engaged, the operator pulls upwardly on handle 62, thus to swing the yoke upwardly carrying with it the rod 54. The handle 62 is pulled upwardly until the rod moves into the overcenter position, like shown in FIG. 5, whereupon spring 65 and the tension in the rod will continue to maintain the yoke in the uppermost position and maintain hook 54a locked to the bumper.

The stabilizing leg 63 can be dropped and positioned so that the foot engages the ground.

To release the upper section 23 of tower, it is necessary only to depress the lever pad 66 of lever 65 so as to disengage engage the detent 65a from shoulder 69. By pulling cable 70, the tower can now be raised and it can be set at any position which is desired in the manner noted earlier.

Ascent of the tower by the workman is on the struts 26, 27, which serve as rungs.

Return of the tower to the stored condition is easily accomplished. The upper tower section is lowered as earlier described and automatically latches into its locked condition with respect to lower tower section 22 as the lower end of the upper section becomes reengaged with latch detent 65a. The stabilizing leg or foot 63 can now be raised and the tower disengaged from the bumper passing downwardly on the handle 62 until it moves through the overcenter position whereupon the hook 54a will be disengaged. The entire tower can now be pivoted on axis 41 until the tower is horizontal and then slid toward the cab of the truck until it reaches the position of FIG. 1. As it reaches this position, the detent latch 52 automatically reengages with opening 42a in plate 42 and the tower is locked once again into the stored position.

From the foregoing description, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations.

Since many possible embodiments may be made of the invention without departing from the scope thereof, it is to be understood that all matter herein set forth or shown in the accompanying drawings to be interpreted as illustrative and not in a limiting sense.

Having thus described my invention, I claim:

1. A mobile ladder-type tower assembly for mounting on a vehicle and movable between a stored, generally horizontal position above the vehicle and an erect position adjacent the rear of the vehicle, said tower comprising a connecting structure for connection with said vehicle and including an arm and a guide member on one end of the arm, means for mounting the other end of said arm to said vehicle near one end of the vehicle for swinging movement of said arm and guide member about a substantially horizontal axis extending transversely of the vehicle, a tower slidably connected with said guide member and having a working end and a base at the end opposite from the working end, said tower in said stored position adapted to overlie said vehicle with said base near said guide member in said erect position to stand adjacent the end of the vehicle with said base well below said guide member and, releasable latch means operable to automatically secure said tower base to said vehicle in response to movement of said tower into the erect position thereby to stabilize said tower in the erect position.

2. A tower as in claim 1, including
extendable and retractable foot means at the base end of said tower for engagement with the ground when the tower is in the erect position.

3. A tower as in claim 1, including
releasable locking means for locking said tower to and in said relationship with said guide member when said tower is in said stored position.

4. A tower as in claim 1,
said releasable latch means including a hook member engageable with a portion of the vehicle in response to movement of said tower into said erect position.

5. A tower as in claim 4,
said releasable latch means further including means for moving said hook member between operating and nonoperating positions with respect to said vehicle portion, and
a releasable holding means for maintaining said hook in said operating condition.

6. A tower as in claim 3,
said tower comprising at least two telescopically interconnected sections, said operating end on one section and said base on the other, said one section having a retracted position and a plurality of extended positions relative to said other section, and
releasable latch means for securing one section to said other section in said retracted position.

7. A tower as in claim 1,
a working platform connected with said operating end of said tower and providing support surfaces for a workman, said surfaces electrically insulated from said tower.

* * * * *